(12) United States Patent
Karlsen et al.

(10) Patent No.: US 11,071,909 B2
(45) Date of Patent: Jul. 27, 2021

(54) GAME QUALITY-CENTRIC MATCHMAKING FOR ONLINE GAMING

(71) Applicant: Electronic Arts Inc., Redwood City, CA (US)

(72) Inventors: Glenn Arne Karlsen, Vancouver (CA); Yaacov Trakhtenberg, Vancouver (CA); Mark Ryan Waller, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 142 days.

(21) Appl. No.: 15/925,224

(22) Filed: Mar. 19, 2018

(65) Prior Publication Data
US 2019/0282899 A1   Sep. 19, 2019

(51) Int. Cl.
*A63F 13/358* (2014.01)
*A63F 13/67* (2014.01)
*A63F 13/335* (2014.01)

(52) U.S. Cl.
CPC .......... *A63F 13/358* (2014.09); *A63F 13/335* (2014.09); *A63F 13/67* (2014.09); *A63F 2300/534* (2013.01); *A63F 2300/5566* (2013.01); *A63F 2300/5573* (2013.01); *A63F 2300/6027* (2013.01)

(58) Field of Classification Search
CPC .... A63F 13/358; A63F 13/795; A63F 13/798; A63F 2300/534; A63F 2300/5573; A63F 2300/5566; A63F 13/67
USPC ........................................................ 463/42
See application file for complete search history.

(56) References Cited

U.S. PATENT DOCUMENTS

| | | | |
|---|---|---|---|
| 8,425,330 B1 * | 4/2013 | Kislyi ................... | A63F 13/795 463/42 |
| 8,998,726 B1 | 4/2015 | Wakeford et al. | |
| 9,776,091 B1 | 10/2017 | Lebrun et al. | |
| 9,905,076 B2 | 2/2018 | Landen | |
| 2007/0112706 A1 | 5/2007 | Herbrich et al. | |
| 2008/0032759 A1 * | 2/2008 | Takahashi ............. | A63F 13/795 463/1 |
| 2008/0114806 A1 | 5/2008 | Kosche | |

(Continued)

OTHER PUBLICATIONS

International Search Report and Written Opinion dated Apr. 5, 2019, for PCT Application No. PCT/US2018/066500, 8 pages.

(Continued)

*Primary Examiner* — Chase E Leichliter
(74) *Attorney, Agent, or Firm* — Lee & Hayes, P.C.

(57) ABSTRACT

A system and method optimizes game quality by matching players for an online game to one of several virtual games. This matching process may involve filtering the players who wish to play according to various constraint minimizing criteria, packing the players into one or more virtual games to optimize game quality factors of the virtual games, and then instantiating the virtual games to actual online games played by the players. The game packing process may be iterative and may involve adding a new player into a virtual game. Game quality factor (GQF) values prior to and after the placement of the new player in the virtual game may be compared. The comparison of the GQF values may be used, at least in part to determine whether the new player is to remain in the virtual game. Various criteria may be considered in instantiating a virtual game.

20 Claims, 9 Drawing Sheets

(56) References Cited

U.S. PATENT DOCUMENTS

| | | | |
|---|---|---|---|
| 2010/0151933 A1* | 6/2010 | Shibamiya | A63F 13/798 463/23 |
| 2010/0227691 A1 | 9/2010 | Karsten | |
| 2012/0021823 A1* | 1/2012 | Youm | A63F 13/497 463/29 |
| 2012/0034981 A1* | 2/2012 | Yamaguchi | A63F 13/46 463/42 |
| 2012/0122552 A1* | 5/2012 | Youm | A63F 13/497 463/23 |
| 2012/0142429 A1* | 6/2012 | Muller | A63F 13/12 463/42 |
| 2014/0018152 A1* | 1/2014 | Kislyi | A63F 13/12 463/23 |
| 2014/0274404 A1* | 9/2014 | Hoskins | A63F 13/335 463/42 |
| 2015/0011278 A1* | 1/2015 | Kim | A63F 13/58 463/2 |
| 2015/0038234 A1* | 2/2015 | Bojorquez | A63F 13/358 463/42 |
| 2015/0057084 A1* | 2/2015 | Lin | A63F 13/352 463/42 |
| 2016/0001181 A1* | 1/2016 | Marr | A63F 13/60 463/42 |
| 2016/0038234 A1 | 2/2016 | Ladtkow et al. | |
| 2016/0125521 A1 | 5/2016 | Randel | |
| 2016/0206961 A1* | 7/2016 | Taylor | A63F 13/795 |
| 2017/0199879 A1* | 7/2017 | Delattre | G06F 17/11 |
| 2017/0252653 A1* | 9/2017 | Kada | A63F 13/77 |
| 2018/0078861 A1* | 3/2018 | Borggren | A63F 13/80 |
| 2018/0207530 A1 | 7/2018 | Wei et al. | |
| 2019/0232163 A1 | 8/2019 | Wei et al. | |
| 2019/0275431 A1* | 9/2019 | Labate | A63F 13/67 |
| 2020/0054950 A1 | 2/2020 | Labate et al. | |

OTHER PUBLICATIONS

Office Action for U.S. Appl. No. 15/915,888, dated Jun. 3, 2019, Labate, "Matchmaking for Online Gaming With Streaming Players", 7 pages.

Office Action for U.S. Appl. No. 16/662,300, dated Dec. 14, 2020, Labate, "Matchmaking for Online Gaming With Streaming Players", 6 Pages.

* cited by examiner

| | Virtual Game 1 | Virtual Game 2 | Virtual Game 3 | Virtual Game 4 |
|---|---|---|---|---|
| T0 | Player A<br>Player B<br>Player C<br>Player D | Player E<br>Player F<br>Player G<br>Player H | Player I<br>Player J<br>Player K | Player L<br>Player N |
| | GQF Values of Virtual Game 1<br>Fullness = 100<br>Skill Balance = 78<br>Network Quality = 63 | GQF Values of Virtual Game 2<br>Fullness = 100<br>Skill Balance = 82<br>Network Quality = 77 | GQF Values of Virtual Game 3<br>Fullness = 75<br>Skill Balance = 69<br>Network Quality = 88 | GQF Values of Virtual Game 4<br>Fullness = 50<br>Skill Balance = 92<br>Network Quality = 74 |
| T1 | Player M to be placed in an online game | | | |
| T2 | Virtual Game 1<br>Player A<br>Player M<br>Player C<br>Player D | Virtual Game 2<br>Player E<br>Player F<br>Player G<br>Player H | Virtual Game 3<br>Player I<br>Player J<br>Player K<br>Player B | Virtual Game 4<br>Player L<br>Player N |
| | GQF Values of Virtual Game 1<br>Fullness = 100<br>Skill Balance = 66<br>Network Quality = 74 | GQF Values of Virtual Game 2<br>Fullness = 100<br>Skill Balance = 82<br>Network Quality = 77 | GQF Values of Virtual Game 3<br>Fullness = 100<br>Skill Balance = 77<br>Network Quality = 84 | GQF Values of Virtual Game 4<br>Fullness = 50<br>Skill Balance = 92<br>Network Quality = 74 |
| T3 | Virtual Game 1<br>Player A<br>Player B<br>Player C<br>Player D | Virtual Game 2<br>Player E<br>Player F<br>Player M<br>Player H | Virtual Game 3<br>Player I<br>Player J<br>Player K<br>Player G | Virtual Game 4<br>Player L<br>Player N |
| | GQF Values of Virtual Game 1<br>Fullness = 100<br>Skill Balance = 78<br>Network Quality = 63 | GQF Values of Virtual Game 2<br>Fullness = 100<br>Skill Balance = 90<br>Network Quality = 74 | GQF Values of Virtual Game 3<br>Fullness = 100<br>Skill Balance = 64<br>Network Quality = 87 | GQF Values of Virtual Game 4<br>Fullness = 50<br>Skill Balance = 92<br>Network Quality = 74 |

FIG. 6

GAME QUALITY-CENTRIC MATCHMAKING FOR ONLINE GAMING

BACKGROUND

Online gaming allows for players to play a variety of electronic and/or video games with each other via network connectivity, such as via the Internet. Users who wish to play a game may be matched with each other to play the game, even though those players may be remotely located from each other. Online gaming may be enabled by game system(s) with which the players may connect using client devices. Online games may be less enjoyable for players if the games do not include a good mix of players.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 illustrates a chart of an example packing of a virtual game, in accordance with example embodiments of the disclosure.

DETAILED DESCRIPTION

Figure 1:
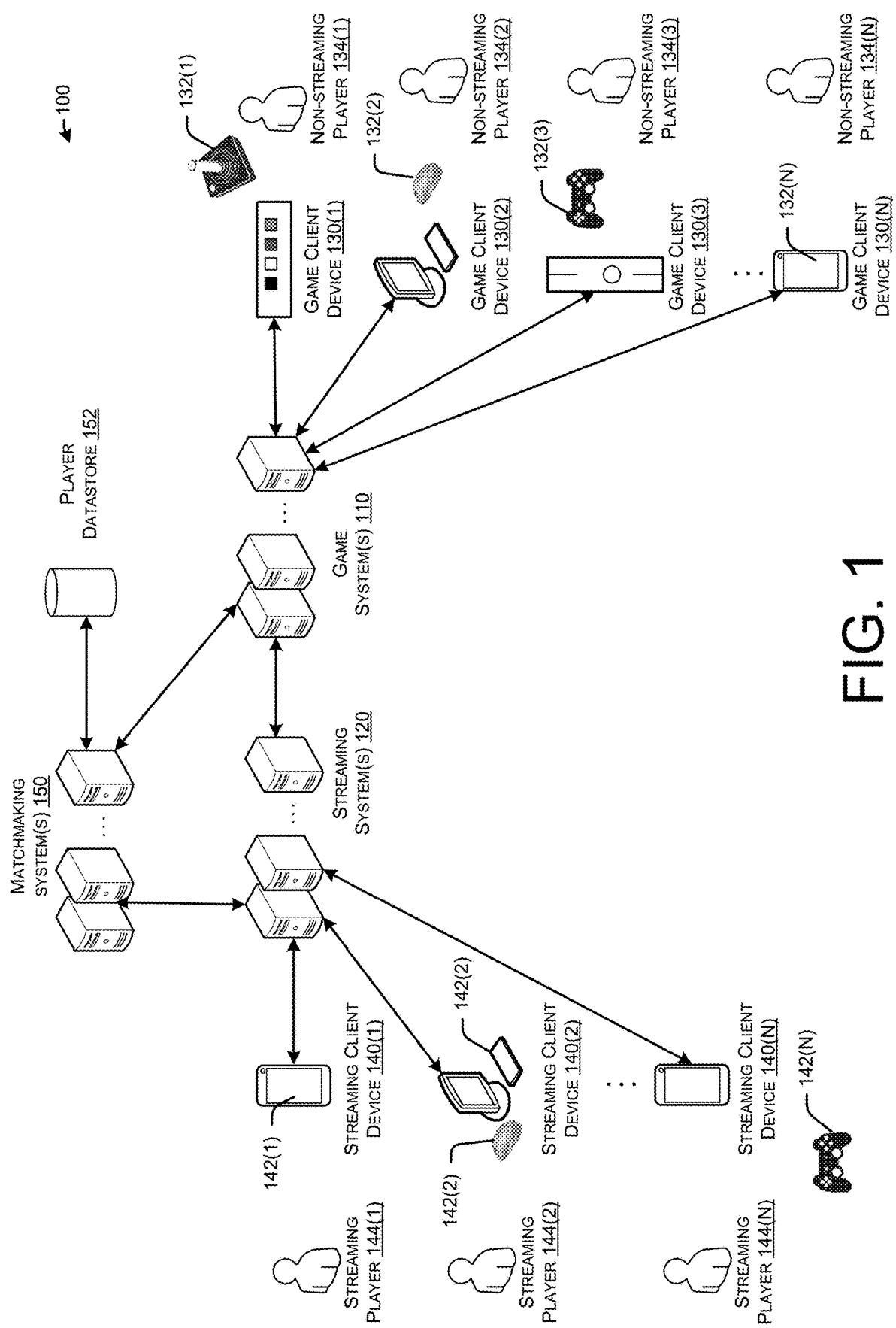
FIG. 1 illustrates a schematic diagram of an example environment with gaming system(s) and steaming system(s) to enable online gaming via client device(s), in accordance with example embodiments of the disclosure.

Example embodiments of this disclosure describes methods, apparatuses, computer-readable media, and systems for matching players for online gaming. In example embodiments of the disclosure, players who play an online game may be matched based at least in part on optimizing game quality factors (GQFs) of virtual games, in accordance with the disclosure herein. Virtual games may be games that are iteratively being optimized for predicted quality if the virtual game is instantiated as an online game. The optimization may be performed by adding and/or subtracting players thereto.

It should be noted that players that are to be placed in an online game, when matched according to balancing a skill level between all of the player allocated to a single game, may not result in the most enjoyable game for the players. Indeed, there may be various factors associated with the game itself, rather than the individual matches that may result in an enjoyable game. Embodiments of the disclosure, as described herein, optimizes factors related to a quality of a virtual game, before that virtual game is instantiated into an online game played by the players allocated to the game. In one sense, a player is added to a virtual game only if the addition of that player improves the virtual game to which he or she is added. Therefore, the mechanism for matchmaking, as disclosed herein, may improve the game playing experience of the players.

When comparing players in a one-to-one fashion, there may be a large number of comparisons when deciding which players to allocate to a particular online game. In fact, if a particular player is compared across each group of the other players that can be allocated to a particular online game, the analysis may approach an n-factorial (n!) order of complexity. The various embodiments for forming online games, as discussed herein, may allocated players to an online game in an iterative evaluation that may use comparisons on the order of n-squared ($n^2$), or less. Thus, the mechanism of player matchmaking, as disclosed herein, may be more efficient than other mechanisms of player matchmaking, resulting in more efficient usage of computer resources.

According to example embodiments, players who wish to play an online game may be filtered into various bins and then within the bins may be iteratively packed into virtual games according to a set of game quality factors (GQFs) evaluated for the virtual game. After iterating through the game packing process, a game may be instantiated as an online game to be hosted by one or more game system(s) for players to play via their client devices.

The filtering mechanism may be implemented to minimize constraints, since all players who wish to play a particular game may not be matched with all other players who wish to play that same game. For example, different players may wish to play in different modes of the game that are not permitted to play together. As another example, in games where a player may choose a particular role, players may be filtered according to those roles. For example, in an online soccer game, a particular player may wish to play goalie, and a particular game may only have two goalies. Thus, in some cases, players may be filtered such that role preferences of the players may be catered to, without causing constraints in the online game. Still further examples of filtering players may include allocating players to different bins according to their geographic location or according to which geographically distributed data center houses the game system(s) they may connect to for enabling the online game.

The game packing process, according to example embodiments, may entail creating one or more virtual games, and iteratively adding a player to one of the virtual games and determining, based at least in part on the GQFs, whether the added player is to remain in the virtual game. For example, for a particular virtual game (e.g., a game being evaluated prior to actualization of the game on one or more game systems), a set of GQF values may be evaluated based at least in part on the players that are currently allocated to the virtual game. Next, a new player who wishes to play the game may be added to the virtual game, and a new set of GQF values may be determined with the new player added to the virtual game. The old set of GQF values without the new player added may be compared to the new set of GQF values with the new player added. If the addition of the new player improves the GQF of the virtual game (e.g., the new GQF values are an improvement over the old GQF values) then the new player may remain in the virtual game. However, if the addition of the new player does not result in an improvement according to the new GQF values, then the new player may be removed from the virtual game and evaluated in a similar manner for a different virtual game.

Thus, when a player is added to a virtual game, according to example embodiments, the player remains in that virtual game if there is an improvement in the virtual game according to GQF considerations. If there is not an improvement, then the player is evaluated in another virtual game, and again assessed according to a change in the GQF values of that virtual game by addition of the new player. In this way, the player may be added to the virtual game where he/she effects a maximal absolute improvement in the GQF values of that virtual game.

The GQFs may include any variety of metrics including, but not limited to, fullness of the game, skill balance of players, skill balance of teams, network connectivity speed balance, combinations thereof, or the like. In example embodiments, the GQFs may have a hierarchy or a ranked level of importance. For example, fullness of the game may be a more important factor to optimize than skill balance of players.

In example embodiments, the GQF values of virtual games may be determined based at least in part on parameters and/or metrics associated with the players that are included in the virtual games. The parameters associated with the players may be associated with the respective players in a player datastore accessible by the matchmaking system(s). For example, based at least in part on historical game play, each player may have a corresponding skill score. A player who exhibits a relatively higher level of skill compared to another player may have a higher skill score than the other player. The skill score of each of the players may be associated with the respective players by way of a user account for each of the players. The user account for each of the players may associated various information about the respective players, including his/her skill score, and may be stored and accessed by one or more matchmaking system(s).

The matchmaking system(s), according to example embodiments, may further access skill scores of the players who wish to play an online game. The skill score for each player, in some example embodiments, may be for the particular online game and/or game mode of play of the online game. Once the skill score is determined, such as from a player datastore, the one or more matchmaking system(s) may use the skill scores, or any other parameters associated with a player to be packed into a virtual game, to determine GQFs associated with virtual games being evaluated. In other words, parameters associated with a current roster of players of a virtual game may be used to determine the GQF values of that virtual game.

As a new player is evaluated for addition in a particular virtual game, the matchmaking system(s) may use parameters associated with a roster of players of a virtual game, including the new player, to determine the GQF values of that virtual game. Thus, the matchmaking system(s) in this way may compare the GQF values with and without the new player to determine if the new player improves the GQFs for the particular virtual game.

In some cases, addition of a new player may push the number of players allocated to a particular virtual game over a maximum number of allowed players. In this case, when a new player is evaluated in the particular virtual game, a pre-existing player may need to be removed from the particular virtual game. In some example embodiments, the matchmaking system(s) may determine a player to remove from the virtual game, the removal of whom would have no adverse impact on the GQF values of the particular virtual game. Thus, the pre-existing players to be replaced may be based at least in part on which player's replacement will improve the game the most.

According to example embodiments, virtual games may be instantiated as online games when a timer associated with the virtual game expires. This timer may be a timer associated with a player waiting to play the online game. For example, if a player wait timer expires at 30 seconds, and a player is currently in a virtual game and has been waiting for 30 seconds, then that virtual game in which he or she belongs may be instantiated by the matchmaking system(s) 150. In example embodiments, a virtual game may be instantiated to an online game if the game has been iteratively evaluated for a threshold number of iterations without an improvement in the GQF values of the virtual game. The matchmaking system(s) 150 may instantiate a virtual game by sending a roster of players of the virtual game to be instantiated to a game system(s) for hosting the online game.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with game system(s) 110 and steaming system(s) 120 to enable online gaming via game client device(s) 130 and streaming client device(s) 140, in accordance with example embodiments of the disclosure.

The example environment 100 may include one or more non-streaming player(s) 134(1), 134(2), 134(3), . . . 134(N), hereinafter referred to individually or collectively as non-streaming player(s) 134, who may interact with respective game client device(s) 130(1), 130(2), 130(3), . . . 130(N), hereinafter referred to individually or collectively as game client device(s) 130 via respective input device(s) 132(1), 132(2), 132(3), . . . , 132(N), hereinafter referred to individually or collectively as input devices 132.

The example environment 100 may further include one or more streaming player(s) 144(1), 144(2), . . . 144(N), hereinafter referred to individually or collectively as streaming player(s) 144, who may interact with respective streaming client device(s) 140(1), 140(2), . . . 140(N), hereinafter referred to individually or collectively as streaming client device(s) 140 via respective input device(s) 142(1), 142(2), . . . , 142(N), hereinafter referred to individually or collectively as input devices 142.

The game client devices 130 may be configured to render content associated with the online game to respective non-streaming players 134. This content may include video, audio, haptic, combinations thereof, or the like content components. The game client device(s) 130 may receive game state information from the one or more game system(s) 110 that may host the online game played by the player(s) 134, 144 of environment 100. The game client device(s) 130 may use the game state information to render current events of the online game as content. The game state information may be received repeatedly and/or continuously and/or as events of the online game transpire. The game state information may be based at least in part on the interactions that each of the player(s) 134, 144 have via their input device(s) 132, 142 responsive to events of the online game hosted by the game system(s) 110.

As events transpire in the online game, the game system(s) 110 may update game state information and send that game state information to the game client device(s) 130. For example, if the players 134, 144 are playing an online soccer game, and the player 134, 144 playing one of the goalies move in a particular direction, then that movement and/or goalie location may be represented in the game state information that may be sent to each of the game client device(s) 130 for rendering the event of the goalie moving in the particular direction. In this way, the content of the online game is repeatedly updated throughout game play. When the game client device(s) 130 receive the game state information from the game system(s) 110, the game client device(s) 130 may render updated content associated with the online game to its respective player 134. This updated content may embody events that may have transpired since the previous state of the game (e.g., the movement of the goalie).

The game client device(s) 130 may accept input from respective non-streaming players 134 via respective input device(s) 132. The input from the non-streaming players 134 may be responsive to events in the online game. For example, in an online basketball game, if a non-streaming player 134 sees an event in the rendered content, such as an opposing team's guard blocking the paint, the non-streaming player 134 may use his/her input device 132 to try to shoot a three-pointer. Intended action by the non-streaming player 134, as captured via his/her input device 132 may be received by the game client device 130 and sent to the game system(s) 110.

The game client device(s) 130 may be any suitable device, including, but not limited to a Sony Playstation® line of systems, a Nintendo Wii® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various players 134, 144 and update the state of the online game based thereon. As the state of the online game is updated, the state may be sent the various game client system(s) 130 for rendering online game content to players 134. In this way, the game system(s) 110 host the online game.

Additionally, the game state information may also be sent by the game system(s) 110, and on behalf of the streaming player(s) 144, to the streaming system(s) 120. In example embodiments, the streaming system(s) 120 may receive online game state information from the game system(s) 110, render the content of the online game for the streaming players 144, and stream the rendered online content to individual ones of the streaming client devices 140. The streaming system(s) 120, therefore, may be able to use the game state data from the gaming system(s) 110 to render the online game for the streaming players 144, without the streaming client device(s) 140 having to render the content associated with the online game. The streaming players 144 may experience (e.g., view, hear, feel, etc.) the content associated with the online game on their streaming client devices 140 based at least in part on streaming content as received from the streaming system(s) 120.

The streaming client device(s) 140 may be any of the devices as discussed with respect to the game client device(s) 130, except the streaming client devices operate in a manner where game content is streamed from the streaming system(s) 120, rather than locally rendering at the streaming client device(s) 140. As a result, the streaming client device(s) 140 may include functionality and/or software to present streaming content to its respective streaming player(s) 144.

The example environment 100 may further include matchmaking system(s) 150 to match players 134, 144 who wish to play the same game and/or game mode with each other. Players 134, 144 may be matched according to game quality factors (GQFs) associated with virtual games that the matchmaking system(s) 150 evaluate and/or optimize. The matchmaking system(s) 150 may add and/or remove players 134, 144 from virtual games being optimized and evaluating those games according to changes in GQF values as players are added and/or removed.

The matchmaking system(s) 150 may receive an indication from the game system(s) 110 and/or the streaming system(s) 120 of players 134, 144 who wish to play an online game. The matchmaking system(s) 150 may access information about the players 134, 144 who wish to play a particular game, such as from a player datastore 152. The information about the players 134, 144 may include skill scores and/or other information that may be used to determine GQF values of virtual games being optimized. A player's skill score in a particular game may be an estimate of a player's expected performance in that game based at least in part on historic game performance data.

The matchmaking system(s) 150 in example embodiments, may continue to create, optimize, and/or instantiate virtual games as new players 134, 144 wish to play join the optimization process. When a timer measuring how long a player 134, 144 has been waiting to play an online game expires, the virtual game in which that player is at that time assigned may be instantiated by the matchmaking system(s) 150. In some example embodiments, if a virtual game has been iterated a threshold number of times without improvements in the virtual game's GQF values, then that game may be instantiated.

Figure 2:
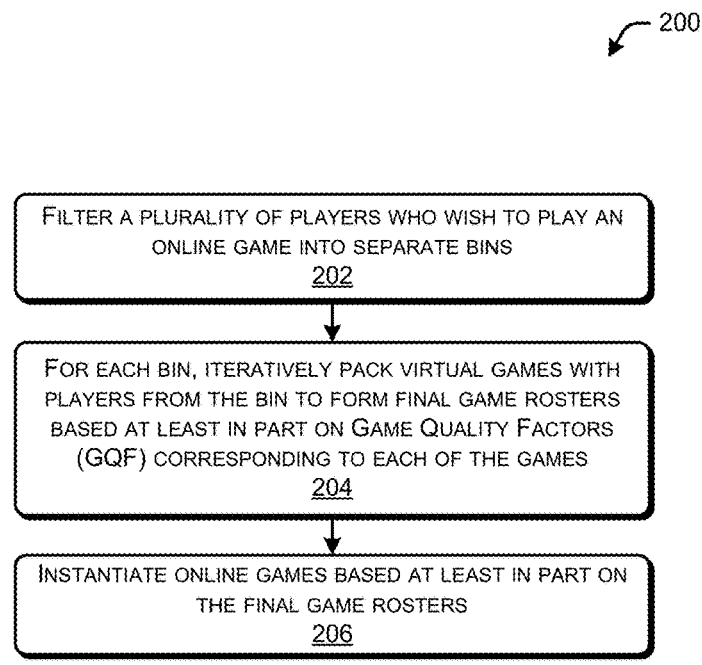
FIG. 2 illustrates a flow diagram of an example method to form one or more online games by selecting players for each of the games, in accordance with example embodiments of the disclosure.

FIG. 2 illustrates a flow diagram of an example method 200 to form one or more online games by selecting players for each of the games, in accordance with example embodiments of the disclosure. The method 200 may be performed by the matchmaking system(s) 150, individually or in cooperation with one or more other elements of the environment 100 of FIG. 1.

At block 202 a plurality of players who wish to play an online game may be filtered into separate bins. This filtering process may be performed by the matchmaking system(s), in example embodiments, to sort players according to groups of players who can play with each other. In other words, this filtering process may reduce constraints in matchmaking online game players.

The filtering process of block 202 may be according to any suitable set of criteria, such as individual players' choices of game modes, individual choices of players' roles, the player's physical location, and/or the quality of players' network connection. When filtered, in example embodiments, players in a particular bin may be compatible for grouping with each other in an online game. In other words, the filtering process of block 202 may separate players 134, 144 from each other into separate bins, if those players are not compatible for grouping together in the same online game.

At block 204, for each of the bins, virtual games may be iteratively packed with players from the bin to form final game rosters based at least in part on game quality factors (GQFs) corresponding to each of the games. This process may involve placing a new player 134, 144 added to a bin into a virtual game and determining if the addition of that player results in an improvement in the GQF values of that virtual game. If there is an improvement, then the player may remain in that virtual game. However, if there is no improvement in the GQF values of the virtual game, then the new player may be removed from that virtual game and evaluated within another virtual game. In this way, the new player may be placed in the first virtual game within which his or her placement results in an improvement in the GQF values of that virtual game.

In example embodiments, the iterative packing of players into games may be stopped according to any suitable stopping criteria. For example, the iterative packing and evaluation of a particular virtual game may be stopped if a threshold number of iterations have been performed without an improvement and/or appreciable improvement in the GQF values associated with a particular game. Additionally, or alternatively, the iterative packing and evaluation of a particular virtual game may be stopped if a timer associated with a player 134, 144 assigned to the virtual game expires. The expiration of a player's timer may indicate that the player has been waiting for a maximum allowed period of time to be placed into an online game. As a result, when the player's timer expires, the player is to be placed in a final game roster and, as a result, his or her virtual game is to be instantiated.

At block 206, online games may be instantiated, based at least in part on the final game rosters. Instantiating the virtual game may entail the matchmaking system(s) 150 sending a final game roster of players 134, 144 to the game system(s) 110.

In some embodiments, the operations of method 200 may be performed out of the order presented, with additional elements, and/or without some elements. Some of the operations of method 200 may further take place substantially concurrently and, therefore, may conclude in an order different from the order of operations shown above.

Figure 3:
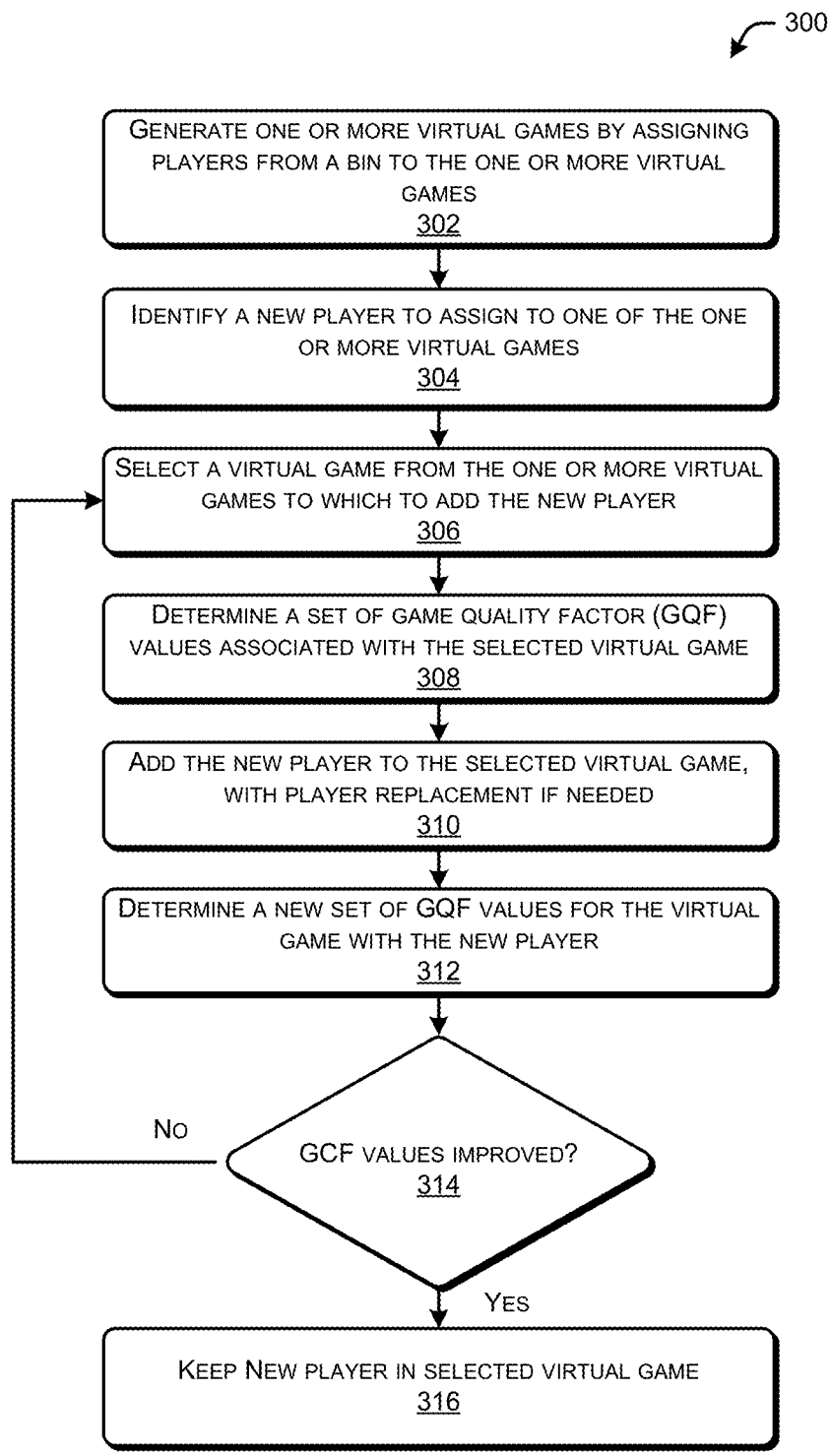
FIG. 3 illustrates a flow diagram of an example method by which a new player who wishes to play an online game is matched to a virtual game prior to instantiating the online game, in accordance with example embodiments of the disclosure.

FIG. 3 illustrates a flow diagram of an example method 300 by which a new player who wishes to play an online game is matched to a virtual game prior to instantiating the online game, in accordance with example embodiments of the disclosure. The method 300 may be performed by the matchmaking system(s) 150, individually or in cooperation with one or more other elements of the environment 100 of FIG. 1.

At block 302, one or more virtual games may be generated by assigning players from a bin to the one or more virtual games. Since all of the players are from the same bin, the players are compatible with each other when matched into the one or more virtual games. This process may be at the start-up of the matchmaking process when there are no pre-existing virtual games yet.

At block 304, a new player to assign to one of the one or more virtual games may be identified. The identification of this new player may be based upon an indication from one or both of the game system(s) 110 and/or the streaming system(s) 120 indicating that the new player wishes to join an online game. This new player may also be filtered into the same bin from which the one or more virtual games of block 302 are generated by a process such as that described in conjunction with block 202 of method 200 of FIG. 2.

At block 306, a virtual game from the one or more virtual games may be selected to which the new player may be added. In example embodiments, the selection of the virtual game may be by selecting the virtual game that has a player timer that is closest to expiry. In other example embodiments, the virtual game may be selected by any other suitable criteria, such as by selecting the virtual game that was first created or selecting the virtual game randomly.

At block 308, a set of game quality factor (GQF) values associated with the selected virtual game may be determined. These GQF values may be determined using one or more functions or algorithms that score the virtual game according to each of the factors included in the GQFs. There any be any number of GQFs that may be used for evaluating the virtual games. For example, GQFs may include fullness of the game, skill balance of players, skill balance of teams, network connectivity speed balance, or the like. A value may be determined for each of the GQFs.

Fullness of the game factor value may be based at least in part on the number of players 134, 144 assigned to a virtual game relative to the maximum number of allowed player in the game. In general, it may be desirable to completely fill an online game. In some alternative cases, it may be desirable to have an online game at a target fullness number of players other than the maximum allowed number of players. Thus, in example embodiments, a relatively high value may be generated for the fullness factor when a virtual game is at or near a target and/or optimal number of players.

The skill balance of players factor value may be based at least in part on any suitable measure of spread in the skill score of players in a virtual game. For example, the two highest skill scores may be compared and the tighter the spread, the greater the skill balance of players factor value for a virtual game may be. Other measures of spread that the matchmaking system(s) 150 may determine may include mean, median, mode, mean average deviation, interquartile range, standard deviation, variance, or the like of the skill scores of the players assigned to a virtual game. In example embodiments, a relatively high value may be generated for the skill balance of players factor value when there is relatively low spread in the skill score for players assigned to a virtual game.

The skill balance of teams factor value may be based at least in part on any suitable measure of difference in the aggregate skill scores of players on two different teams in a virtual game. This GQF factor may be relevant in online games that are team-centric, such as, for example, FIFA 18® by Electronic Arts, of Redwood City, Calif. In some cases, the skill scores of all the players on each team may be summed and compared to each other. In other cases, the one or two best players' skill scores on each team may be compared to get a measure of team differences in skill. In still other cases, an average skill score of one team may be compared to an average skill score of other team(s) for the virtual game. Indeed, any suitable measure of team skill balance may be used to generate the skill balance of teams factor value. In example embodiments, a relatively high value may be generated for the skill balance of teams factor value when there is relatively low difference in the skill levels of teams of a virtual game.

The network connectivity speed balance factor value may be based at least in part on any suitable measure of network speed that players experience during online gameplay, particularly the streaming player 144 of a virtual game. Since network latency and/or network bandwidth constraints may cause variations in times when players of an online game may experience events of the online game, and may influence their reaction times to those events, it may generally be desirable to have minimal variations in network speed for players grouped together in an online game. The network speeds for online players may be received by the matchmaking system(s) 150 from the streaming system(s) 120 and/or the game system(s) 110. In some cases, the matchmaking system(s) 150 may request network latency and/or network bandwidth information from the streaming system(s) 120 and/or the game system(s) 110. The streaming system(s) 120 and/or game system(s) 110 may use any suitable mechanism to measure network speeds between themselves and either a streaming client device 140 or a game client device 130, such as a ping test. The matchmaking system(s) 150 may use any variety of metrics that measure spread in network speeds experienced by players 134, 144, such as a variance, a standard deviation, an interquartile range, or the like. In example embodiments, a relatively high value may be generated for the network connectivity speed balance factor value when there is relatively low spread in the network speeds experienced by players of a virtual game.

At block 310, the new player may be added to the selected virtual game with player replacement if needed. At block 312, a new set of GQF values for the virtual game with the new player may be determined. This determination may be similar to the determination of the GQF values at block 308, except parameters for the new player is used in determining the new set of GQF values for the virtual game.

At block 314, it may be determined if the GQF values improved. In other words, the matchmaking system 150 may determine if the new set of GQF values after adding the new player to the selected virtual game is an improvement over the GQF values prior to adding the new player to the selected virtual game. Individual factor values of the set of GQF values may be compared to corresponding factor values of the new set of GQF values to determine if the new set of GQF values are an improvement from prior to adding the new player to the selected virtual game. In some example embodiments, a hierarchy of the GQFs, where some GQFs are more important than others, may be considered when determining if the new set of GQF values are an improvement over the previous set of GQF values.

At block 314, if it is determined that the GQF values improved by adding the new player to the selected virtual game, then the method 300 may proceed to block 316 where the new player is kept in the selected virtual game. On the other hand, if it is determined at block 316 that the GQF values did not improve by including the new player in the selected virtual game, then the method 300 may return to block 306 to select a new virtual game from the one or more virtual games in which to place the new player for evaluation of the newly selected virtual game with inclusion of the new player. In this way, the new player may be evaluated in a selected one of the one or more virtual games until the new player fits into a virtual game that improves due to the new player's inclusion in that virtual game.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4A:
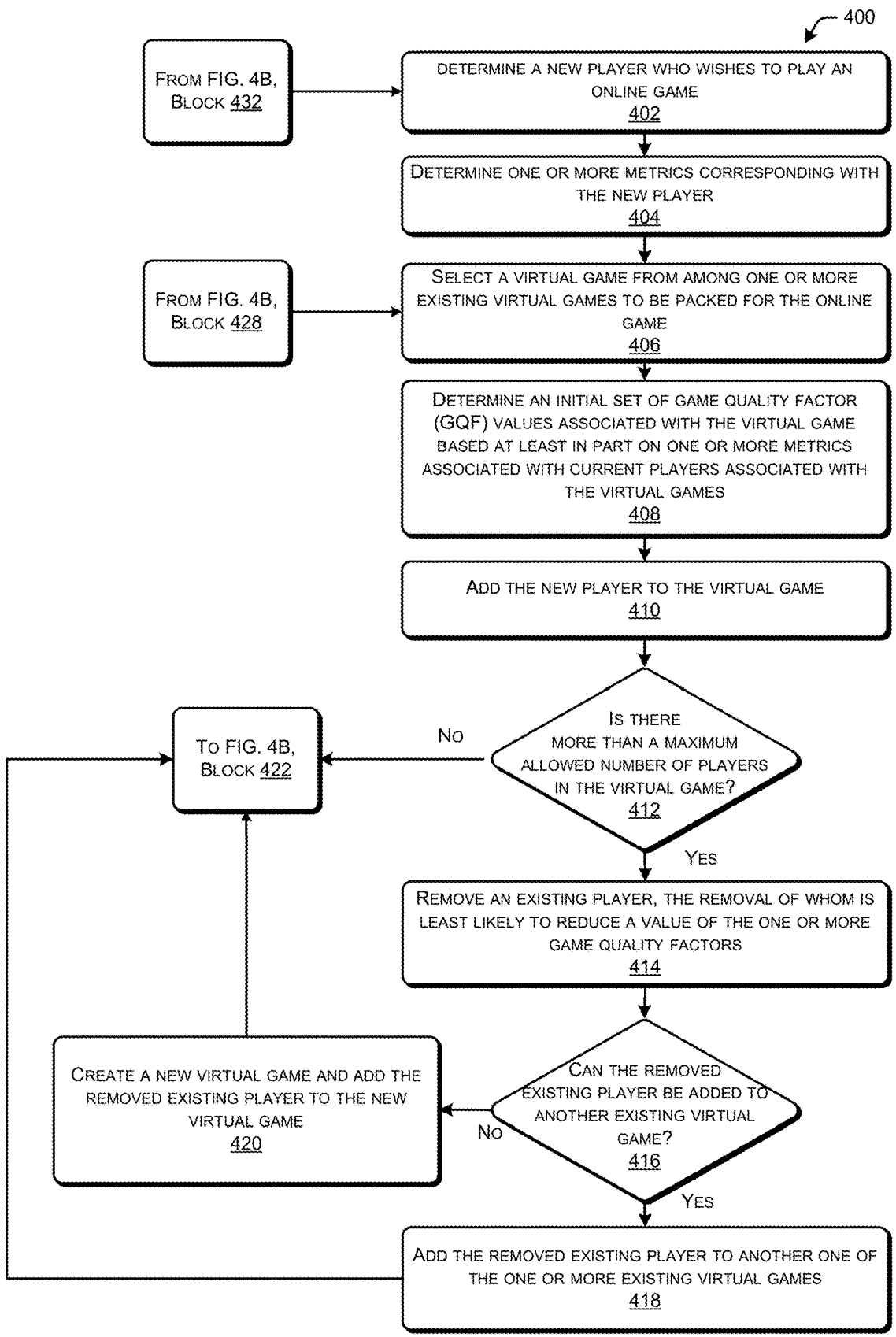
FIGS. 4A and 4B illustrate flow diagrams of an example method to pack players into a virtual game using game quality factors (GQFs) and then instantiate the virtual game, in accordance with example embodiments of the disclosure.
Figure 4B:
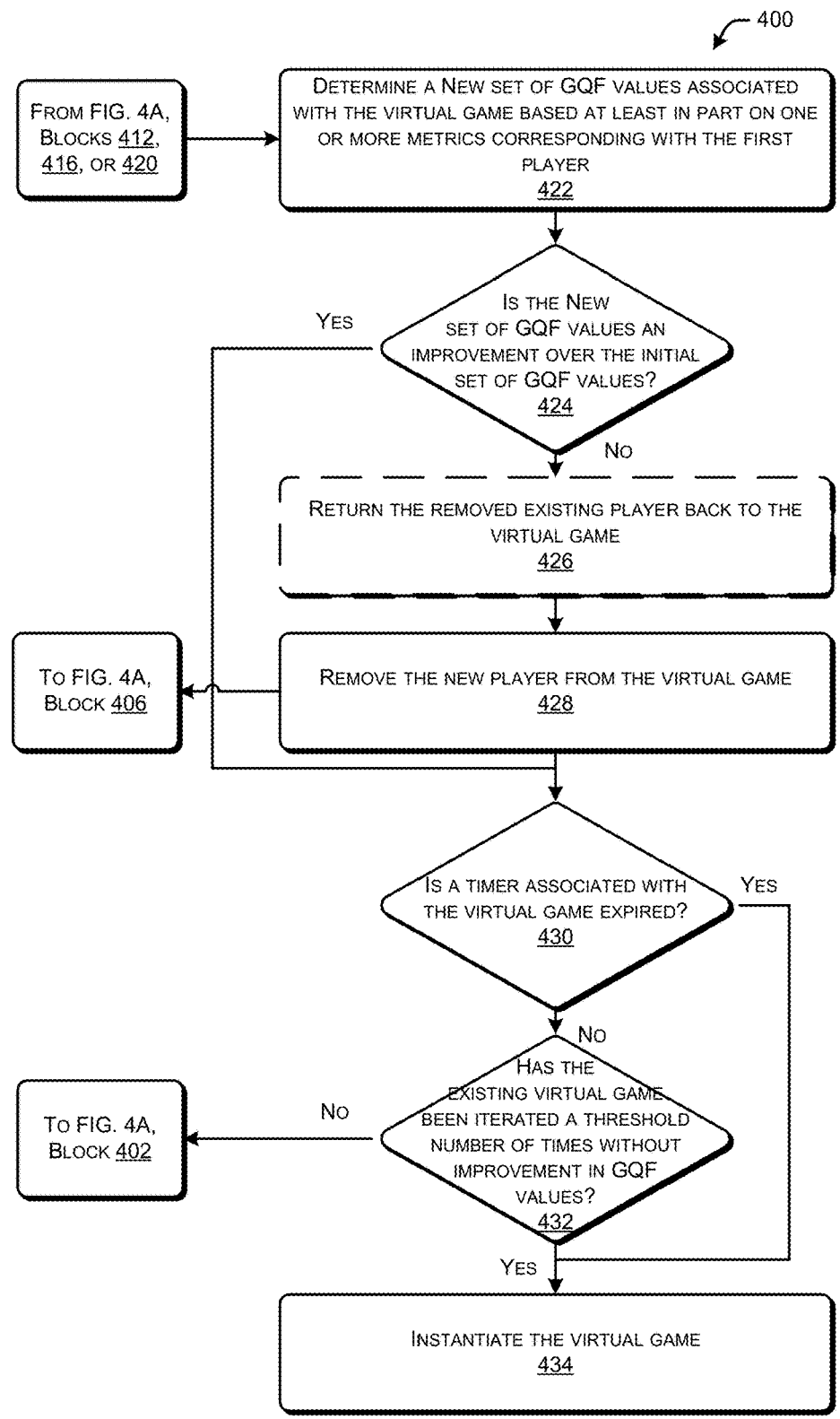

FIGS. 4A and 4B illustrate flow diagrams of an example method 400 to pack players into a virtual game using game quality factors (GQFs) and then instantiate the virtual game, in accordance with example embodiments of the disclosure. The method 400 may be performed by the matchmaking system(s) 150, individually or in cooperation with one or more other elements of the environment 100 of FIG. 1. In example embodiments, the method 400 may be an example implementation of blocks 204 and 206 of method 200 of FIG. 2.

At block 402, a new player who wishes to play an online game may be determined. At block 404, one or more metrics corresponding with the new player may be determined. These one or more metrics may include any variety of descriptors of the new player such as his or her skills score for the online game that he or she wishes to play. In example embodiments, the matchmaking system(s) 150 may access a player datastore 152 to retrieve the one or more metrics corresponding with the new player. These one or more metrics for the new player may be accessed from the player datastore 152 using the new player's identifier.

At block 406, a virtual game may be selected from among one or more existing virtual games to be packed for the online game. In some cases, the selection of the virtual game may be based upon a game that may have players with timers that are relatively close to expiry. In other cases, other mechanisms may be used to select the virtual game from among the one or more existing virtual games.

At block 408, an initial set of GQF values associated with the virtual game may be determined based at least in part on one or more metrics associated with the current players associated with the virtual game. This determination of GQF values may be based at least in part on the one or more metrics corresponding to the new player. At block 410, the new player may be added to the virtual game. At block 412, it may be determined if there is more than a maximum allowed number of players in the virtual game. The matchmaking system may compare the number of players in a virtual game to data about the maximum allowed number of players in that online game.

If it is determined that there is not more than a maximum number of players in the virtual game at block 412, then the method 400 may proceed to block 422. On the other hand, if it is determined that there is more than a maximum number of players in the virtual game, then the method 400 may proceed to block 414 where an existing player is removed from the virtual game and the removal of whom is least likely to reduce a value of the one or more game quality factors. In example embodiments, a player whose removal would have no adverse impact on the GQF values of the virtual game may be removed from the virtual game. At block 416, it may be determined if the removed existing player can be added to another existing virtual game.

If at block 416, it is determined that the removed existing player can be added to another existing virtual game, then at block 418 the removed existing player may be added to another one of the one or more existing virtual games. If, on the other hand, it is determined that block 416 that the removed existing player cannot be added to another existing virtual game, then at block 420 a new virtual game may be created and the removed existing player may be added to the new virtual game.

From blocks 418 or 420, the method 400 may proceed to block 422. At block 422, a new set of GQF values associated with the virtual game may be determined based at least in part on one or more metrics corresponding with the first player. At block 424, it may be determined if the new set of GQF values are an improvement over the initial set of GQF values. If it is determined at block 424 that the new set of GQF values are not an improvement over the initial set of GQF values, then at block 426 the existing player may be returned back to the virtual game. This operation may be optional and may only occur if a player was removed at block 414. At block 428, the new player may be removed from the virtual game. In other words, the processes of block 426 and 428 revert the virtual game back to the original set of players prior to the addition of the new player to the virtual game.

If a block 424 it is determined that the new set of GQF values are an improvement over the initial set of GQF values, then the method 400 may proceed to block 430. From block 428, the method 400 may bifurcate and proceed to block 406, where the new player may be added to another virtual game selected from among the one or more existing virtual games. At the same time, the method 400 may proceed to block 430 where it may be determined if a timer associated with the virtual game has expired.

If at block 430 it is determined that a timer associated with the virtual game has expired, then the method 400 may proceed to block 434 where the virtual game is instantiated as an online game. If, on the other hand, it is determined that a timer associated with the virtual game has not expired, then the method 400 may proceed to block 432 to where it may be determined if the virtual game has been iterated a threshold number of times without improvement in GQF values.

If at block 432 it is determined that the existing virtual game has been iterated a threshold number of times, then the method 400 may proceed to block 434 where the virtual game is instantiated as an online game. If, on the other hand, it is determined at block 432 that the virtual game has not been iterated a threshold number of times without improvement, then the method 400 may return to block 402 where a new player who wishes to play an online game may be identified and the procedures of method 400 may be repeated.

According to some embodiments, the operations of method 400 may be performed out of the order presented, with additional elements, and/or without some elements. Some of the operations of method 400 may further take place substantially concurrently and, therefore, may conclude in an order different from the order of operations shown above.

Figure 5:
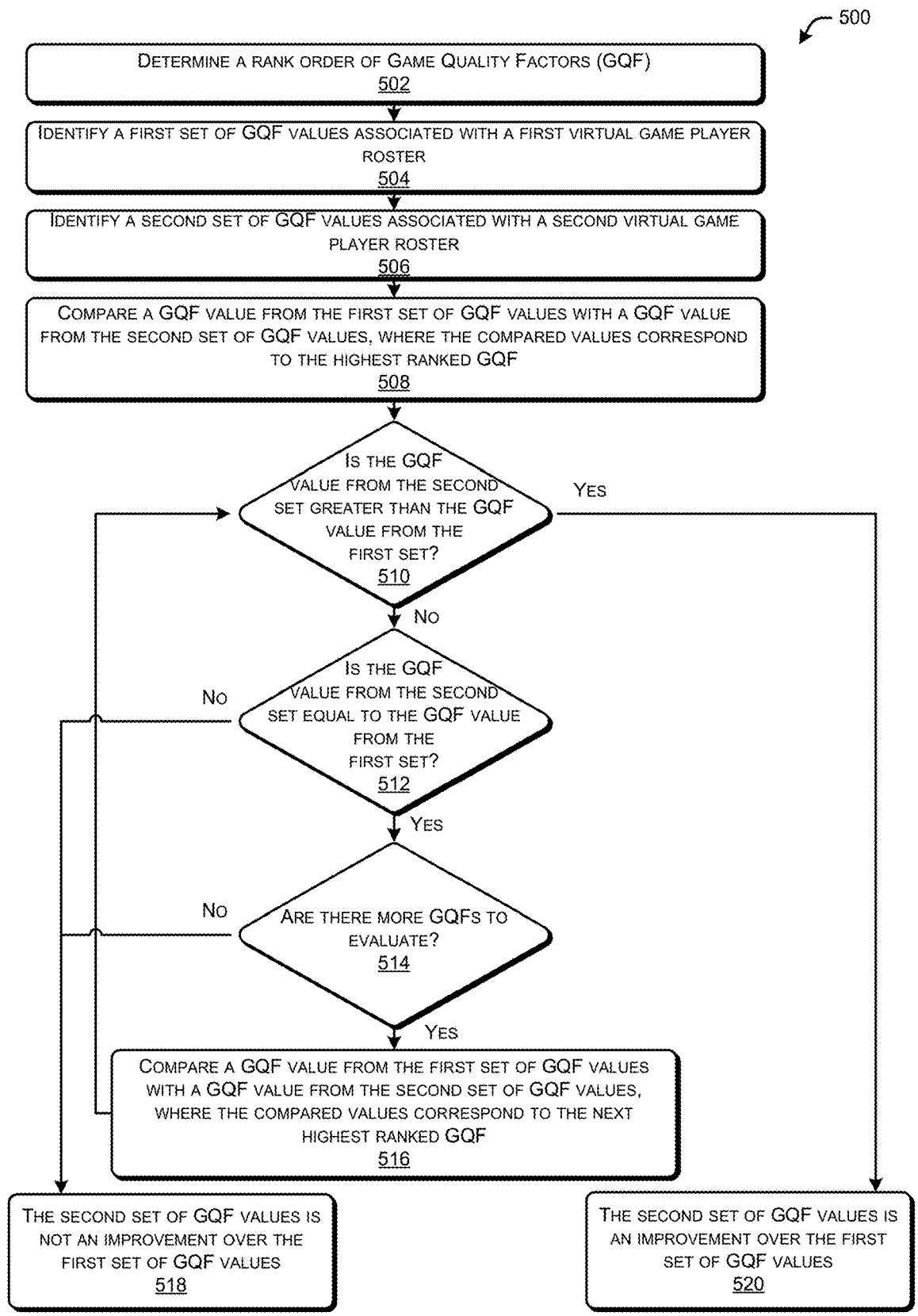
FIG. 5 illustrates a flow diagram of an example method to determine whether a first set of game quality factors (GQFs) is better than a second set of GQFs for a virtual game, in accordance with example embodiments of the disclosure.

FIG. 5 illustrates a flow diagram of an example method 500 to determine whether a first set of game quality factors (GQFs) is better than a second set of GQFs for a virtual game, in accordance with example embodiments of the disclosure. The method 500 may be performed by the matchmaking system(s) 150, individually or in cooperation with one or more other elements of the environment 100 of FIG. 1. In example embodiments, the method 500 may be an implementation of the operations of block 424 of method 400 of FIG. 4.

At block 502, a rank order of GQFs may be determined. This rank order may determine which of the game quality factors are given more importance in optimizing game packing relative to the other factors of the GQFs. In other words, a lower-ranking factor may not be optimized at the cost of a higher-ranking factor. In this way, a hierarchy of the game quality factors may be considered during the game packing optimization process.

At block 504, a first set of GQF values associated with a first virtual game player roster may be identified. At block 506, a second set of GQF values associated with a second virtual game player roster may be identified. At block 508, a GQF value from the first set of GQF values may be compared with a GQF value from the second set of GQF values, where the compared values correspond to the highest-ranked GQF.

At block 510, it may be determined if the GQF value from the second set is greater than the GQF value from the first set. If at block 510 it is determined that the GQF value from the second set is greater than the GQF value from the first set then the method 500 may proceed to block 520, where it may be determined that the second set of GQF values is an improvement over the first set of GQF values. If, on the other hand, at block 510 it is determined that the GQF value from the second set is not greater than the GQF value from the first set, then the method 500 may proceed to block 512, where it may be determined if the GQF value from the second set is equal to the GQF value from the first set.

If at block 512, it is determined that the GQF value from the second set is not equal to the GQF value from the first set, then the method 500 may proceed to block 518, where it is determined that the second set of GQF values is not an improvement over the first set of GQF values. If, on the other hand, it is determined at block 512 that the GQF value from the second set is equal to the GQF value from the first set, then the method 500 may proceed to block 514, where it may be determined if there are more GQF values to evaluate.

If it is determined at block 514 that there are no more GQFs to evaluate, then the method 500 may proceed to block 518, where it is determined that the second set of GQF values is not an improvement over the first set of GQF values. If, on the other hand, it is determined at block 514 that there are more GQFs to evaluate, then the method 500 may proceed to block 516, where a GQF value from the first set of GQF values is compared with a GQF value from a second set of GQF values, where the compared values correspond to the next highest ranked GQF. The method 500 may then return to block 510 to determine if the net highest ranked GQF can determine if the second set of GQF values are an improvement over the first set of GQF values.

According to some embodiments, the operations of method 500 may be performed out of the order presented, with additional elements, and/or without some elements. Some of the operations of method 500 may further take place substantially concurrently and, therefore, may conclude in an order different from the order of operations shown above.

FIG. 6 illustrates a chart 600 of an example packing of a virtual game, in accordance with example embodiments of the disclosure.

The chart 600 demonstrates an example player packing progression in time from T0 to T1 to T2 to T3. At time T0, there may be four different virtual games being optimized prior to instantiation as indicated as virtual game 1, virtual game 2, virtual game 3, and virtual game 4. The players assigned to each of the virtual games are shown under the virtual game labels. Additionally, game quality factor (GQF) values for each of the virtual games are shown underneath the listing of players that are currently in each of the virtual games. For example, virtual game 2 at time T0 includes player E, player F, player G, and player H, and has GQF values for fullness at 100, skill balance at 82, and network quality at 77. In this example, the GQF values may be on a scale of 0-100. However, it should be understood that the GQF values may be on any suitable scale (e.g., 0-1, 1-10, 0-1000, etc.).

In this example, GQFs have a hierarchy, where fullness is ranked above skill balance, and skill balance is ranked above network quality. In other words, when evaluating a virtual game, fullness may not be sacrificed in favor of skill balance or network quality. Similarly, skill balance may not be sacrificed in favor of network quality.

At time T1, the matchmaking system(s) 150 may determine that another player, player M, is to be matched into an online game. At time T2, the player M may be added to virtual game 1. In this example, the maximum number of players in any game can be 4. Therefore, by adding player M to virtual game 1, one of the existing players from player A, player B, player C, or player D must be removed from virtual game 1 to accommodate the addition of player M virtual game 1. In this case, player B may be removed from virtual game 1 and placed in virtual game 3.

At this point the GQF values for each of the virtual games may be recalculated. This recalculation takes into account the shuffling of players, specifically the addition of player M into virtual game 1 and player B into virtual game 3. Player B may be moved, in example embodiments, based at least in part on a determination that the removal of player B may have the least detrimental effect on virtual game 1's GQF values. In this case, the GQF values for virtual game 2 and virtual game 4 do not change since there is no change to the player roster for either one of those virtual games. However, virtual game 1's GQF values change—while the fullness score does not change, the skill balance score decreases and the network quality score increases.

In this case, since there is a decrease in the skill balance score, without any improvement in the fullness score, player M may not remain in virtual game 1. In other words, the addition of player M into virtual game 1 in favor of player B, does not provide an improvement in the set of GQF values for virtual game 1, and therefore the addition of player M to virtual game 1 is to be unwound. It should be noted that the network quality factor value of virtual game 1 improved with the addition of player M into virtual game 1. However, the network quality factor is ranked less than the skill balance factor, and therefore, in aggregate the set of GQF values for virtual game 1 diminished due to the addition of player M.

At time equals T3, player M is removed from virtual game 1 and instead added to virtual game 2. As expected, the GQF values for virtual game 1 revert back to what they originally were at time T0, prior to the addition of player M. When player M is added to virtual game 2, a player from virtual game 2, in this case player G, is removed and placed in another virtual game, specifically virtual game 3. Again, since there is no change to the player roster for virtual game 4, the GQF values for virtual game 4 remain the same as they were at time T2 and time T0. However, the GQF values for both virtual game 2 and virtual game 3 change relative to what they were at time T2.

For virtual game 2, the fullness factor value does not change. However, the skill balance factor value improves, while the network quality factor value decreases slightly. Since the skill balance factor has a higher ranking than the network quality factor, player M is to remain in virtual game 2, since the addition of player M improves the set of GQF values for virtual game 2. Therefore, player G also remains in virtual game 3. This example in chart 600 is a time slice of the game packing process, and it should be understood that this type of iterative optimization of the GQF values may continue until one or more of the virtual games are instantiated as an online game.

Figure 7:
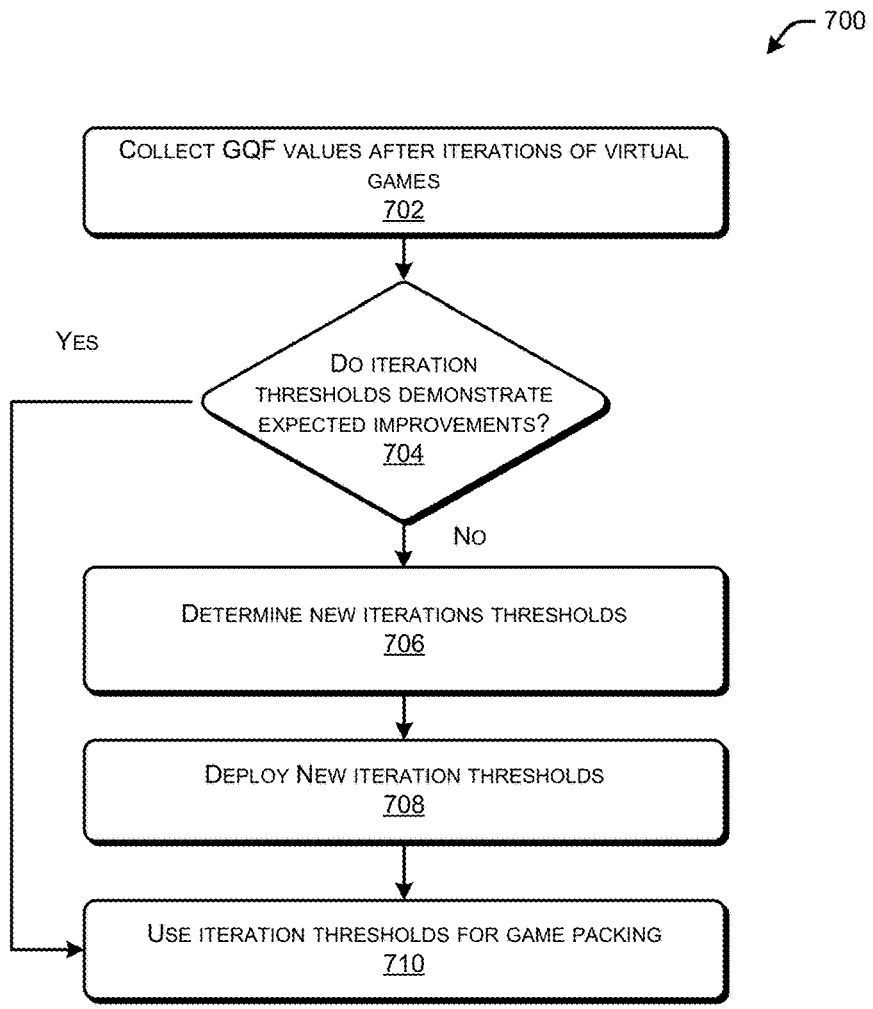
FIG. 7 illustrates a flow diagram of an example method for determining thresholds iterations when packing a virtual game, in accordance with example embodiments of the disclosure.

FIG. 7 illustrates a flow diagram of an example method 700 for determining thresholds iterations when packing a virtual game, in accordance with example embodiments of the disclosure. The method 700 may be performed by the matchmaking system(s) 150, individually or in cooperation with one or more other elements of the environment 100 of FIG. 1.

At block 702, game quality factor (GQF) values may be collected after iterations of virtual games. At block 704, it may be determined if the iteration thresholds demonstrate expected improvements. This determination may provide an indication of whether optimizations completed by reaching an iteration limit provide as high GQFs as an optimization that did not end according to the iteration threshold. Alternatively, this determination may provide an indication of a probability that a set of GQFs can improve after a certain number of iterations without improvement.

If at block 704 it is determined that the iteration thresholds demonstrate the expected improvements, then the method 700 may continue to block 710 where the iteration thresholds are continued to be used for the purposes of game packing. However, if it is determined at block 704 that the iteration thresholds do not demonstrate the expected improvements in GQF values, then the method may continue to block 706 where new iteration thresholds may be determined. After determining the new iteration thresholds, at block 708 the new iteration thresholds may be deployed, after which, at block 710 the iteration thresholds may be used for the purposes of game packing.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

Figure 8:
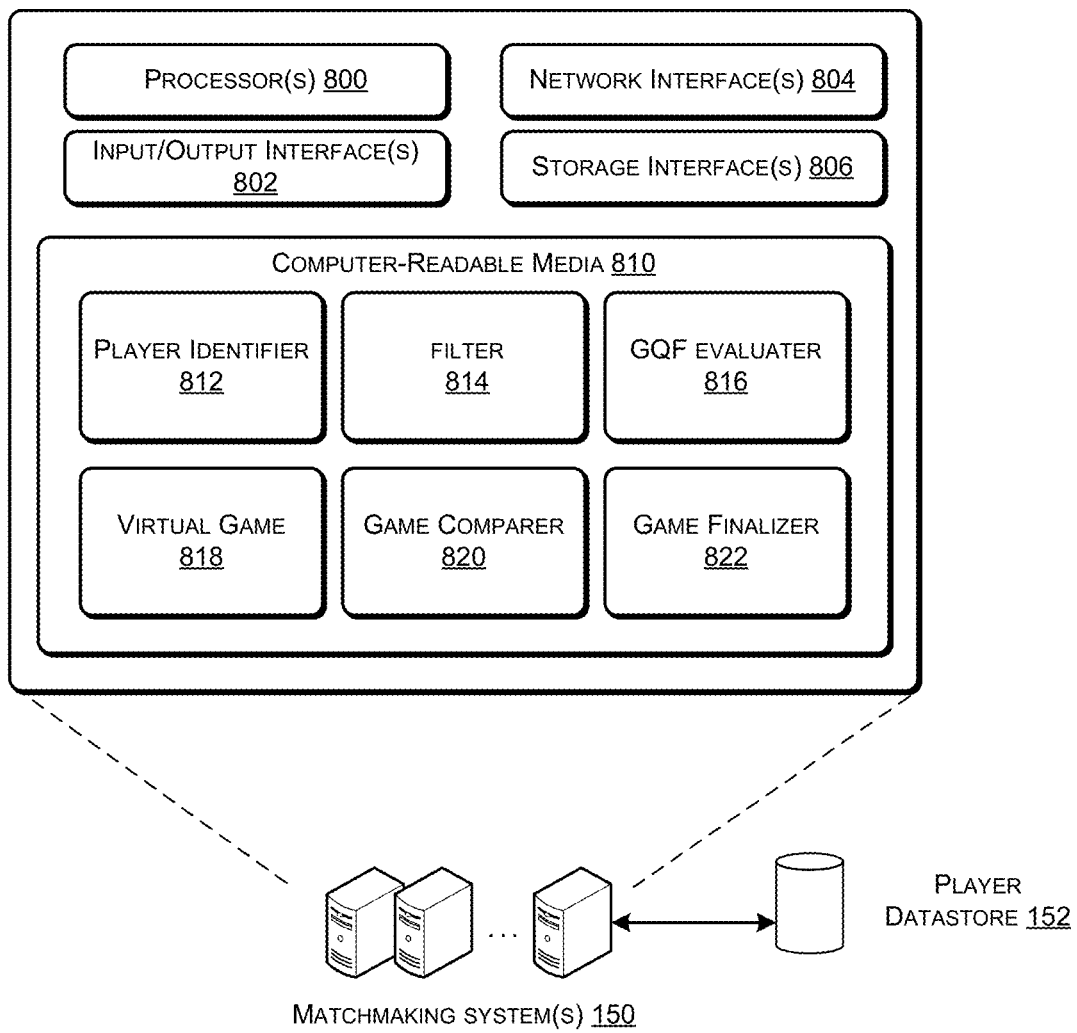
FIG. 8 illustrates a block diagram of example matchmaking system(s) that may provide matchmaking for online games based on game quality factors (GQFs), in accordance with example embodiments of the disclosure.

FIG. 8 illustrates a block diagram of example matchmaking system(s) 150 that may provide matchmaking for online games based on game quality factors (GQFs), in accordance with example embodiments of the disclosure.

The matchmaking system(s) 150 may include one or more processor(s) 800, one or more input/output (I/O) interface(s) 802, one or more network interface(s) 804, one or more storage interface(s) 806, and computer-readable media 810.

In some implementations, the processors(s) 800 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 800 may possess its own local memory, which also may store program modules, program data, and/or one or more operating systems. The one or more processor(s) 800 may include one or more cores.

The one or more input/output (I/O) interface(s) 802 may enable the matchmaking system(s) 150 to detect interaction with a user and/or other systems, such as one or more game system(s) 110 or one or more streaming system(s) 120. The I/O interface(s) 802 may include a combination of hardware, software, and/or firmware and may include software drivers for enabling the operation of any variety of I/O device(s) integrated on the matchmaking system(s) 150 or with which the matchmaking system(s) 150 interacts, such as displays, microphones, speakers, cameras, switches, and any other variety of sensors, or the like.

The network interface(s) 804 may enable the matchmaking system(s) 150 to communicate via the one or more network(s). The network interface(s) 804 may include a combination of hardware, software, and/or firmware and may include software drivers for enabling any variety of protocol-based communications, and any variety of wireline and/or wireless ports/antennas. For example, the network interface(s) 804 may comprise one or more of a cellular radio, a wireless (e.g., IEEE 802.1x-based) interface, a Bluetooth® interface, and the like. In some embodiments, the network interface(s) 804 may include radio frequency (RF) circuitry that allows the matchmaking system(s) 150 to transition between various standards. The network interface(s) 804 may further enable the matchmaking system (s) 150 to communicate over circuit-switch domains and/or packet-switch domains.

The storage interface(s) 806 may enable the processor(s) 800 to interface and exchange data with the computer-readable medium 810, as well as any storage device(s) external to the matchmaking system(s) 150, such as the player datastore 152.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 800 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 300. The computer-readable media 810 may have an operating system (OS) and/or a variety of suitable applications stored thereon. The OS, when executed by the processor(s) 800 may enable management of hardware and/or software resources of the matchmaking system(s) 150.

Several functional blocks having instruction, data stores, and so forth may be stored within the computer-readable media 810 and configured to execute on the processor(s) 800. The computer readable media 810 may have stored thereon a player identifier block 812, a filter block 84, a GQF evaluator block 816, a virtual game block 818, a game comparer block 820, and a game finalizer block 822. It will be appreciated that each of the functional blocks 812, 814, 816, 818, 820, 822, may have instructions stored thereon that when executed by the processor(s) 800 may enable various functions pertaining to the operations of the matchmaking system(s) 150.

The instructions stored in the player identifier block 812, when executed by the processor(s) 800, may configure the matchmaking system(s) 150 to identify player(s), such as new player(s) who wish to join an online game. In some cases, the processor(s) 800 may request player identification information, such as from the game system(s) 110 and/or streaming system(s) 120. The processor(s) 800 may further access a player datastore 152 to obtain parameters and other data, such as skill scores for players 134, 144.

The instructions stored in the filter block 814, when executed by the processor(s) 800, may configure the matchmaking system(s) 150 to filter player(s) 134, 144 who wish to join an online game into separate bins according to one or more parameters. These parameters may include game modes that a player wishes to play, player roles, the player's physical location, and/or the quality of the player's network connection. The quality of the player's network connection may be tested by the game system(s) 110 and/or the streaming system(s) 120 by any suitable mechanism, such as a ping test. In some cases, the processor(s) 800 may provision network speed measurement, such as by messaging the game system(s) 110 and/or streaming system(s) 120.

The instructions stored in the GQF evaluator block 816, when executed by the processor(s) 800, may configure the matchmaking system(s) 150 to determine GQF values for virtual games that are being optimized. The processor(s) 800 may determine any variety of GQF values, such as fullness of the game, skill balance of players, skill balance of teams, network connectivity speed balance, or the like. The processor(s) may generate GQF values on any suitable scale, such as for example, a 0-100 range or a 0-1 range.

The processor(s) 800 may generate the fullness of the game factor value based at least in part on the number of players assigned to a virtual game relative to the maximum number of allowed player in the game. In general, it may be desirable to completely fill an online game. In some alternative cases, it may be desirable to have an online game at a target fullness number of players other than the maximum allowed number of players. Thus, in example embodiments, a value of 100 (on a 0-100 range) may be generated for the fullness factor when a game is at a target and/or optimal number of players in a virtual game.

The processor(s) 800 may generate the skill balance of players factor value based at least in part on any suitable measure of spread in the skill score of players in a virtual game. For example, the two highest skill scores may be compared to the average skill score in the game, and the tighter the spread, the greater the skill balance of players factor value for a virtual game may be. Other measures of spread that the one or more processor(s) 800 may use to generate the skill balance of players factor value may include mean, median, mode, mean average deviation, inter-quartile range, standard deviation, variance, or the like of the skill scores of the players assigned to a virtual game. Thus, in example embodiments, a relatively high value may be generated for the skill balance of players factor value when there is relatively low spread in the skill score for players assigned to a virtual game.

The processor(s) 800 may generate the skill balance of teams factor value based at least in part on any suitable measure of difference in the skill scores of players on two different teams in a virtual game. This GQF factor may be relevant in online games that are team-centric, such as, for example, Madden NFL® by Electronic Arts, of Redwood City, Calif. In some cases, the one or two best players' skill scores on each team may be compared to get a measure of team differences in skill. In other cases, an average skill score of one team may be compared to an average skill score of other team(s) for the virtual game. Indeed, any suitable measure of team skill balance may be used by the processor(s) 800 to generate the skill balance of teams factor value. In example embodiments, a relatively high value may be generated for the skill balance of teams factor value when there is relatively low difference in the skill levels of teams of a virtual game.

The processor(s) 800 may generate the network connectivity speed balance factor value based at least in part on any suitable measure of network speed that players experience during online gameplay, particularly the streaming player 144, for a virtual game. Since network latency and/or network bandwidth constraints may cause variations in times when players of an online game may experience events of the online game, and may influence their reaction times to those events, it may generally be desirable to have minimal variations in network speed for players grouped together in an online game. The network speeds for online players may be received from the streaming system(s) 120 and/or the game system(s) 110. In some cases, the processor(s) 800 may request network latency and/or network bandwidth information from the streaming system(s) 120 and/or the game system(s) 110. The streaming system(s) 120 and/or game system(s) 110 may use any suitable mechanism to measure network speeds between themselves and either a streaming client device 140 or a game client device 130, such as a ping test. The processor(s) 800 may use any variety of metrics that measure spread in network speeds experienced by players 134, 144, such as a variance, a standard deviation, an interquartile range, or the like. In example embodiments, a relatively high value may be generated for the network connectivity speed balance factor value when there is relatively low spread in the network speeds experienced by players of a virtual game.

The instructions stored in the virtual game block 818, when executed by the processor(s) 800, may configure the matchmaking system(s) 150 to manage and track rosters associated with various virtual games being optimized. The processor(s) 800 may also create new virtual games, such as at the start-up of the matchmaking system(s) 150 and/or when all pre-existing virtual games in a particular bin are already full and a new player is added to the bin to be placed in a virtual game.

The instructions stored in the game comparer block 820, when executed by the processor(s) 800, may configure the matchmaking system(s) 150 to assess whether one set of GQF values are better than another set of GQF values. In one sense the processor(s) 800 may compare GQF values before and after adding a new player to a virtual game. This determination of whether there is an improvement in GQF values may take into account any hierarchy and/or ranking of the various factors of the GQFs.

The instructions stored in the game finalizer block 822, when executed by the processor(s) 800, may configure the matchmaking system(s) 150 to finalize and/or instantiate a virtual game. The processor(s) 800 may maintain timers associated with each of the players 134, 144 being matched into an online game, where the timer may indicate how long the corresponding player has been waiting to get placed in an online game. Individual player timers may expire, the expiry of which may indicate that the player should be in an online game. When a player's timer expires, the processor(s) 800 may instantiate the virtual game in which that player is at that time. The processor(s) may also track the number of times a virtual game has been iterated without an improvement in its GQF values. In some example embodiments, if a virtual game has been iterated a threshold number of times without improvements in the virtual game's GQF values, then the processor(s) 800 may be instantiate that virtual game as an online game. Instantiating a game may entail sending an online game roster of players to the game system(s) 110 to host the online game.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    one or more processors; and
    one or more computer-readable media storing computer-executable instructions that, when executed by the one or more processors, cause the one or more processors to:
        identify a new player that is to play an online game;
        determine a first virtual game associated with a first set of players and a second virtual game associated with a second set of players;
        determine a first set of game quality factor (GQF) values associated with the first virtual game, wherein the first set of GQF values are based at least in part on network connectivity speed balance between the first set of players;
        determine a second set of GQF values associated with the second virtual game;
        add the new player to the first set of players;
        determine a third set of GQF values associated with the first virtual game after adding the new player to the first set of players;
        determine that the third set of GQF values lack improvement over the first set of GQF values;
        remove, based at least in part on the third set of GQF values lacking an improvement over the first set of GQF values, the new player from the first set of players;
        add the new player to the second set of players;
        determine a fourth set of GQF values associated with the second virtual game after adding the new player to the second set of players;
        determine that the fourth set of GQF values are an improvement over the second set of GQF values by determining that one or more factors associated with the fourth set of GQF values are an improvement over respective one or more factors associated with the second set of GQF values, while none of the one or more factors associated with the fourth set of GQF values are worse than the respective one or more factors associated with the second set of GQF values; and
        instantiate the second virtual game, with the new player, as an online game.

2. The system of claim 1, wherein the computer-executable instructions further cause the one or more processors to:
    determine, based at least in part on an identifier of the new player, one or more parameters of the new player, the one or more parameters comprising a skill score of the new player,
    wherein the third set of GQF values are based at least in in part on the skill score of the new player, and wherein the fourth set of GQF values are based at least in part on the skill score of the new player.

3. The system of claim 1, wherein to instantiate the second virtual game, the computer-executable instructions further cause the one or more processors to:
    determine at least one of: (i) a timer associated with one or more of the second set of players have expired; or (ii) the second virtual game has been iterated a threshold number of times; and
    send information about the second set of players and the new player to a game system.

4. The system of claim 1, wherein to identify the new player that is to play the online game, the computer-executable instructions further cause the one or more processors to:
    receive, from a game system, an indication that the new player is to play the online game, the new player associated with a new player identifier.

5. The system of claim 4, wherein the computer-executable instructions further cause the one or more processors to:
    determine, from a player datastore, a set of parameters for the new player based at least in part on the new player identifier, the set of parameters comprising a skill score for the new player.

6. The system of claim 1, wherein the first set of GQF values comprise a first factor value corresponding to a first GQF and a second factor value corresponding to a second GQF, wherein the third set of GQF values comprise a third factor value corresponding to the first GQF and a fourth factor value corresponding to the second GQF, wherein the first GQF is ranked higher than the second GQF, and wherein to determine that the third set of GQF values lack improvement over the first set of GQF values, the computer-executable instructions further cause the one or more processors to at least one of:
    (i) determine that the third factor value is less than the first factor value; or
    (ii) determine that the third factor value is equal to the first factor value and the fourth factor value is less than the second factor value.

7. The system of claim 1, wherein the first set of GQF values correspond to at least one of: (i) fullness of the first virtual game; (ii) skill balance of the of the first virtual game; (iii) team size balance; or (iv) team skill balance.

8. The system of claim 1, wherein the computer-executable instructions further cause the one or more processors to:
    filter the new player according to one or more filtering parameters; and
    determine, based at least in part on filtering the new player, that the new player is compatible with the first virtual game and the second virtual game.

9. A computer-implemented method, comprising:
    identifying a new player that is to play an online game;
    determining a virtual game associated with a set of players;

determining a first set of game quality factor (GQF) values associated with a first virtual game, wherein the first set of GQF values are based at least in part on network connectivity speed balance between the set of players;

adding the new player to the set of players;

determining a second set of GQF values associated with the virtual game after adding the new player to the set of players;

determining that the second set of GQF values are an improvement over the first set of GQF values by determining that one or more factors associated with the second set of GQF values are an improvement over respective one or more factors associated with the first set of GQF values while none of the one or more factors associated with the second set of GQF values are worse than the respective one or more factors associated with the first set of GQF values; and determining, based at least in part on the second set of GQF values are an improvement over the first set of GQF values, that the new player is to be kept in the virtual game.

10. The computer-implemented method of claim 9, further comprising:

instantiating the virtual game as an online game based at least in part on at least one of determining at least one of: (i) a timer associated with one or more of the set of players have expired; or (ii) the virtual game has been iterated a threshold number of times.

11. The computer-implemented method of claim 9, further comprising:

filtering the new player according to one or more filtering criteria; and determining, based at least in part on filtering the new player, that the new player is compatible with the virtual game.

12. The computer-implemented method of claim 9, further comprising:

determining, from a player datastore, a set of parameters of the new player based at least in part on a new player identifier, the set of parameters comprising a skill score for the new player, the second set of GQF values based at least in part on the set of parameters.

13. The computer-implemented method of claim 9, wherein the virtual game is a first virtual game, the method further comprising:

determining that adding the new player to the first virtual game results in a number of players in the first virtual game exceeding a threshold;

removing a first player from the first virtual game; and adding the first player to a second virtual game.

14. The computer-implemented method of claim 13, further comprising:

determining that the removal of the first player results in a smaller reduction in the second set GQF values of the first virtual game compared to removal of other ones of the set of players.

15. A system, comprising:

one or more processors; and one or more computer-readable media storing computer-executable instructions that, when executed by the one or more processors, cause the one or more processors to:

filter a plurality of new players for playing an online game into one or more bins according to one or more criteria;

combine a set of players from a first bin into a virtual game;

identify a new player filtered into the first bin;

add the new player to the virtual game;

determine that the addition of the new player into the virtual game improves a set of game quality factor (GQF) values of the virtual game by determining that one or more factors associated with the set of GQF values improve over respective one or more factors associated with an initial set of GQF values, while none of the one or more factors associated with the set of GQF values are worse than the respective one or more factors associated with the initial set of GQF values, wherein the GQF values are based at least in part on network connectivity speed balance between the set of players; and instantiate the virtual game as the online game.

16. The system of claim 15, wherein the one or more bins correspond to one or more game modes of the online game.

17. The system of claim 15, wherein the virtual game is a first virtual game, and wherein to add the new player into the virtual game, the computer-executable instructions further cause one or more processors to:

determine that adding the new player to the first virtual game results in a number of players in the first virtual game exceeding a threshold;

determine that a first player is to be removed from the first virtual game, the first player selected from the set of players;

remove the first player from the first virtual game; and add the first player to a second virtual game.

18. The system of claim 17, wherein to determine that the first player is to be removed from the first virtual game, the computer-executable instructions further cause one or more processors to:

determine that the removal of the first player results in a smaller reduction in the GQF values of the first virtual game compared to removal of other ones of the set of players.

19. The system of claim 17, wherein the set of GQF values are a first set of GQF values, wherein the computer-executable instructions further cause the one or more processors to:

determine that adding the first player to the second virtual game improves a second set of GQF values associated with the second virtual game; and keep, based at least in part on the improvement of the second set of GQF values, the first player in the second virtual game.

20. The system of claim 17, wherein the set of GQF values are a first set of GQF values, wherein the computer-executable instructions further cause the one or more processors to:

determine that adding the first player to the second game diminishes a second set of GQF values associated with the second virtual game;

remove, based at least in part on the diminishment of the second set of GQF values, the first player from the second virtual game; and add the first player to a third virtual game.

* * * * *